United States Patent
Moffitt (10) Patent No.: US 9,317,479 B2
(45) Date of Patent: *Apr. 19, 2016

(54) MULTI-WAY NUMBER PARTITIONING USING WEAKEST LINK OPTIMALITY

(71) Applicant: International Business Machines Corporation, Armonk, NY (US)

(72) Inventor: Michael D. Moffitt, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 159 days.

This patent is subject to a terminal disclaimer.

(21) Appl. No.: 14/098,566

(22) Filed: Dec. 6, 2013

(65) Prior Publication Data

US 2014/0365545 A1 Dec. 11, 2014

Related U.S. Application Data

(63) Continuation of application No. 13/914,878, filed on Jun. 11, 2013.

(51) Int. Cl.
  *G06F 17/11* (2006.01)
  *G06F 9/50* (2006.01)

(52) U.S. Cl.
  CPC .............. *G06F 17/11* (2013.01); *G06F 9/5083* (2013.01)

(58) Field of Classification Search
  CPC ................................ G06F 17/11; G06F 9/5083
  See application file for complete search history.

(56) References Cited

U.S. PATENT DOCUMENTS

| 6,272,483 B1 | 8/2001 | Joslin et al. |
| 6,560,758 B1 | 5/2003 | Jain |
| 2013/0080118 A1 | 3/2013 | Stergiou et al. |

OTHER PUBLICATIONS

Favier, Aurelle, et al., "Pairwise Decomposition for Combinatorial Optimization in Graphical Models", Proc. 22nd Int'l. Joint Conf. on Artificial Intelligence, v. 3, pp. 2126-2132 (2011).

Karmarkar, Narendra, et al., "The Differencing Method of Set Partitioning", Technical Report UCB/CSD 82/113, Computer Science Division, University of California, Berkely (1982).

Korf, Richard E., "From Approximate to Optimal Solutions: A Case Study of Number Partitioning", Proc. of the 14th International Joint Conf. on Artificial Intelligence, pp. 266-272 (1995).

(Continued)

*Primary Examiner* — Chuong D Ngo (74) *Attorney, Agent, or Firm* — Steven L. Bennett; Jack V. Musgrove (57) ABSTRACT

Multi-way partitioning is dramatically improved based on "weakest-link" optimality. The set of numbers to be partitioned is subjected to pairwise decomposition with a first partition having a candidate subset ($P_1=\{S_1\}$), and a lower cost bound $c_{min}$ is set equal to a maximum cost of this subset. A recursive call is then invoked to resolve the subproblem of the second partition ($P_2=\{S_2, S_3, \ldots, S_k\}$). If each second candidate subset in the second partition has a cost which is less than or equal to the lower cost bound, then the first partition is returned with the second partition as an optimal solution regardless of whether the second partition is an optimal decomposition. Additional efficiency may be achieved by excluding any subset having a cost which is greater than or equal to the best cost so far. Dominated and symmetric solutions can also be excluded.

6 Claims, 5 Drawing Sheets

(56) References Cited

OTHER PUBLICATIONS

Korf, Richard E., "A Complete Anytime Algorithm for Number Partitioning", Artificial Intelligence, v. 106, n. 2, pp. 181-203 (Dec. 1998).

Korf, Richard E., "Multi-Way Number Partitioning", Proc. of the 21st International Joint Conf. on Artificial Intelligence, pp. 538-543 (2009).

Korf, Richard E., "Objective Functions for Multi-Way Number Partitioning", Proc. of the 3rd Annual Symposium on Combinatorial Search (2010).

Korf, Richard E., "A Hybrid Recursive Multi-Way Number Partitioning Algorithm", Proc. of the 22nd International Joint Conf. on Artificial Intelligence, pp. 591-596 (2011).

Cerquides, Jesus, et al., "Speeding Up 2-Way Number Partitioning", Proc. of the 20th European Conf. on Artificial Intelligence, pp. 223-227 (2012).

$S = \{1, 2, ..., 9\}$
$k = 4$
$c_{min} = 9$
$c_{max} = 45$

$c_{min} = 12$ $\sum S_i \leq c_{min}$

FIG. 4

$c_{min} = 12$ $\sum S_i = 11$

FIG. 5

$c_{min} = 12$ $\sum S_2 \nleq c_{min}$

MULTI-WAY NUMBER PARTITIONING USING WEAKEST LINK OPTIMALITY

CROSS-REFERENCE TO RELATED APPLICATION

This application is a continuation of copending U.S. patent application Ser. No. 13/914,878 filed Jun. 11, 2013.

BACKGROUND OF THE INVENTION

1. Field of the Invention

The present invention generally relates to number theory, and more particularly to a method of partitioning a set of numbers to find an optimal solution.

2. Description of the Related Art

Number partitioning is one of the most basic problems in combinational optimization: it seeks to divide a set S of n positive numbers across a set of k mutually exclusive and collectively exhaustive subsets $<S_1, S_2, \ldots, S_k>$ so as to minimize the sum of the largest set. For instance, given the set of integers $\{5, 4, 3, 2, 1\}$, the 3-way partitioning $<\{5\}, \{4, 1\}, \{3, 2\}>$ is an optimal solution that perfectly balances all subsets to an equal sum of 5. Despite its simplicity, number partitioning is nevertheless "NP-complete" (nondeterministic polynomial time) and is often used to prove the NP-completeness of other quantitative reasoning problems, e.g., bin packing, knapsack, etc. Real-world applications and extensions of number partitioning are numerous, including multi-processor scheduling, machine reassignment, and voting manipulation. Hence, efficient methods to determine optimal solutions are of particular interest in the broader scope of combinatorial search.

One of the easiest approaches to number partitioning is a heuristic known as the greedy algorithm which can quickly produce high-quality (albeit suboptimal) solutions. According to the greedy algorithm, the numbers in the set are sorted by size in decreasing order, and each one is incrementally assigned to the partition whose size is currently the smallest. This approach can be modified to compute optimal solutions by incorporating backtracking: each assignment of a number to a partition creates a different branch in search, and all possible combinations of assignments are attempted in order to produce the one with minimal cost. By extending this depth-first framework with branch-and-bound pruning techniques and symmetry breaking, one arrives at the complete greedy algorithm (CGA).

An alternative greedy heuristic referred to as KK (after Karmarkar-Karp) constructs solutions in an entirely different way. Rather than committing each number to a specific partition, it instead considers potential pairings based on set differences. In each iteration of the algorithm, the two largest numbers are extracted from the set, and replaced by their absolute difference. In doing so, the numbers (or more generally, the subsets containing them) are ensured to be assigned to different partitions. The ultimate arrangement of these subsets is not finalized until the list is fully processed. A complete extension to this heuristic exists as well (the complete Karmarkar-Karp algorithm, or CKK). The additional branches in this variation correspond to set unions, where numbers are joined rather than assigned to exclusive subsets. For k=2, CKK performs dramatically faster than CGA (especially in the presence of perfect partitions) and can be further improved by pruning certain leaf nodes. However, due to the high overhead and bookkeeping required, CKK is less effective for large values of k.

In CGA, each number $S_i$ is committed to a specific subset before the assignment of any subsequent numbers are processed. A radically different approach is taken by the methodology referred to as recursive number partitioning (RNP), in which a complete set of members for a range of partitions is constructed (and partitioned) before considering the members of subsequent partitions. If k is even, the set of partitions may be divided in half, and each individual number can be assigned to one half or the other. If k is odd, the partitions may be divided into $S_1$ and $[S_2, S_k]$. In order to explore the space of all possible arrangements, an inclusion-exclusion tree is searched. An internal node of this tree may be pruned if a partial subset cannot possibly extend to a better solution. The leaves of this tree correspond to coarse decompositions of numbers to subproblems, but not necessarily to assignments within each group. To construct solutions, optimal partitions are obtained for each subproblem, and combined if their concatenation results in an improved solution. Subproblems are solved in the same way; only in the base case (where k=2) is traditional two-way partitioning employed. For certain values of n and k, RNP is several orders of magnitude faster than CGA.

The basic framework of RNP has recently been enhanced in two fundamental ways to produce the improved recursive number partitioning (IRNP) algorithm. First, the inclusion-exclusion tree is replaced by an extension of the Schroeppel/Shamir algorithm that more effectively searches the space of viable subset sums. This new approach divides the set of numbers in half and enumerates all possible subsets in each division. Although this algorithm requires exponential memory, it allows very fast exploration of satisficing sums simply by iterating through the two halves in tandem. Second, the solver makes calls to CGA (or CKK) for small n, since these problems tend to be more amenable to the original search space.

SUMMARY OF THE INVENTION

The present invention is generally directed to multi-way partitioning of a set of positive numbers by establishing a first partition for a pairwise decomposition of the set wherein the first partition has a first candidate subset of the numbers, setting a lower cost bound equal to a maximum cost of the first candidate subset according to an objective function, recursively generating second partitions for the pairwise decomposition wherein each second partition has a plurality of second candidate subsets of the numbers, determining that each second candidate subset in a selected one of the second partitions has a cost according to the objective function which is less than or equal to the lower cost bound and, responsive to said determining, returning the first partition with the selected second partition as an optimal solution regardless of whether the selected second partition is an optimal decomposition. In the exemplary application, the objective function is minimizing a sum of a largest partition of the set of numbers. Additional efficiency may be achieved by excluding any second candidate subset having a cost according to the objective function which is greater than or equal to a best cost, i.e., the cost of the best solution found so far. Dominated and symmetric solutions can also be excluded. These partitioning operations can be iteratively repeated for different pairwise decompositions of the set using different first candidate subsets to return multiple optimal solutions, and the solution having the lowest cost according to the objective function is saved as the best solution. In one example application the set of numbers represent processing costs for a plurality of programming tasks, and the partitioning is used to optimally assign the programming tasks to a plurality of processors.

The above as well as additional objectives, features, and advantages of the present invention will become apparent in the following detailed written description.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

A renewed interest in number partitioning has emerged in recent years. In contrast to earlier approaches that recursively assign individual numbers to subsets, these new algorithms explore the space of potential pairwise decompositions in which entire subsets of numbers are generated in their entirety and partitioned independently. Enhancements to this approach have considered more efficient means of iterating through viable subsets, as well as hybrid schemes that invoke different solving strategies depending on the values n and k. A key insight shared by each of these previous algorithms is a principle of optimality, in which the optimality of the global solution is ensured by exploring only the space of optimal solutions to the elements in each decomposition.

Although this divide-and-conquer strategy is effective in reducing the joint search space of subproblems, the cost of evaluating intermediate solutions remains high: there are exponentially-many decompositions, and the effort to fully resolve each one to optimality imposes a significant burden on the core optimization engine. To make matters worse, each decomposition is solved independently from the last, resulting in a high degree of similar state searched between successive invocations of the subproblem solver. These deficiencies seriously limit the efficacy of prior algorithms, especially for large values of k that require several levels of bisection. It would, therefore, be desirable to devise an improved method of number partitioning which could avoid expensive solving of decomposition subproblems. It would be further advantageous if the method could achieve such improved efficiencies while still retaining advantageous behaviors of these previous approaches.

The present invention achieves these objectives using a new approach to multi-way number partitioning. Unlike previous algorithms, the construction of potentially suboptimal decompositions is allowed, a task that is much easier to achieve and less time consuming. Under certain conditions, this approach may even neglect to produce solutions to subproblems if they exist. Yet, this novel method is still able to provide the same properties as previous algorithms, including completeness, anytime behavior, and (most importantly) a guarantee of global optimality. To achieve this, the invention exploits a specific property of the objective function and develops a principle of "weakest-link" optimality that eliminates the need to consider purely optimal decompositions. This principle is used to strengthen the relationship between sequential decompositions by enforcing tighter bounds on partial assignments, and also to detect and remove dominated solutions from consideration. The performance of this new algorithm is extremely competitive, outperforming the previous state-of-the-art by orders of magnitude and reducing average runtime on the largest benchmarks from several hours to less than a second. Empirical data also suggest that the performance profile of our algorithm is nearly independent of k.

Figure 1:
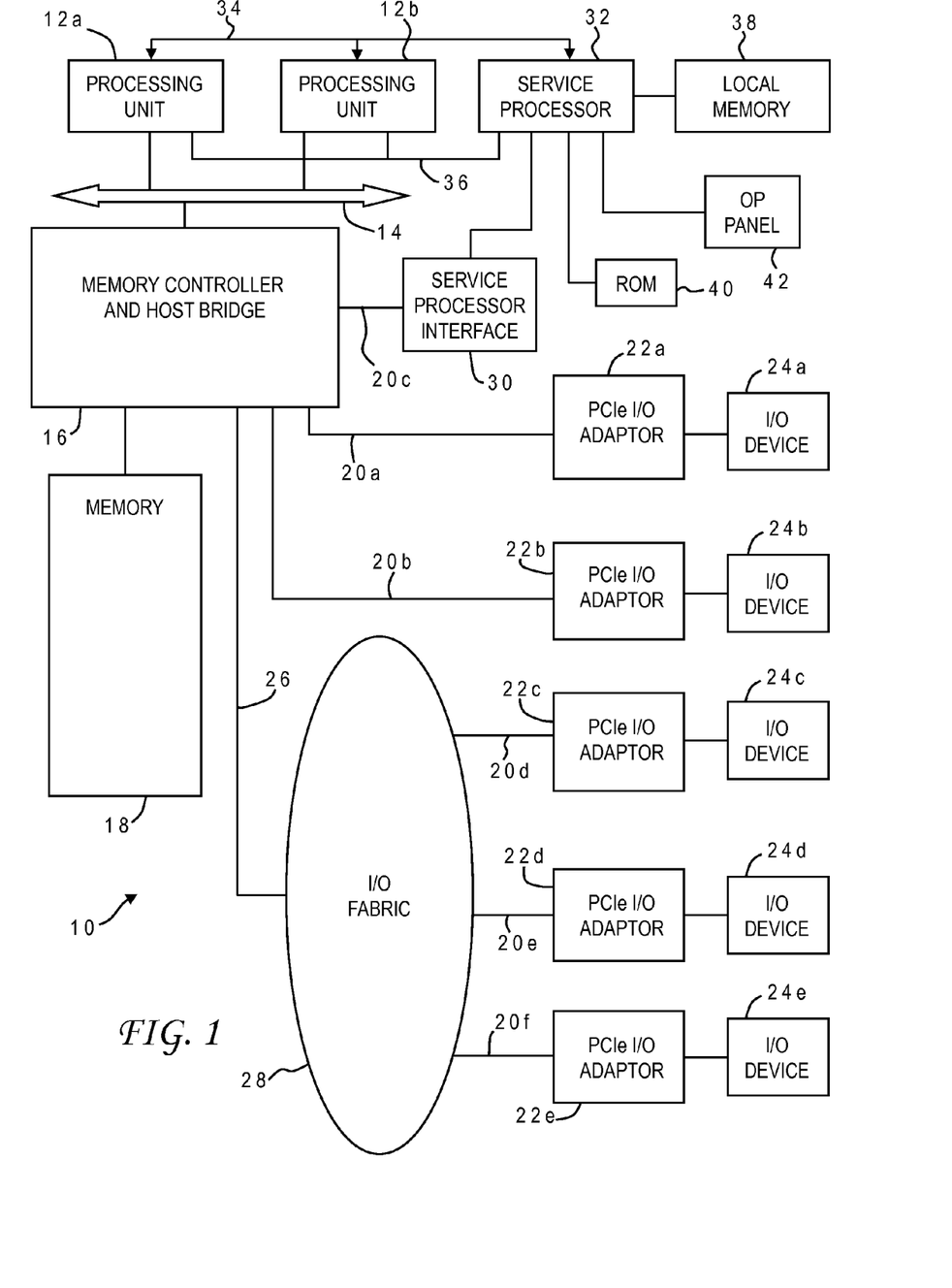
FIG. 1 is a block diagram of a computer system programmed to carry out number partitioning in accordance with one implementation of the present invention.

With reference now to the figures, and in particular with reference to FIG. 1, there is depicted one embodiment 10 of a computer system in which the present invention may be implemented to carry out number partitioning for various applications. Computer system 10 is a symmetric multiprocessor (SMP) system having a plurality of processors 12a, 12b connected to a system bus 14. System bus 14 is further connected to and communicates with a combined memory controller/host bridge (MC/HB) 16 which provides an interface to system memory 18. System memory 18 may be a local memory device or alternatively may include a plurality of distributed memory devices, preferably dynamic random-access memory (DRAM). There may be additional structures in the memory hierarchy which are not depicted, such as on-board (L1) and second-level (L2) or third-level (L3) caches.

MC/HB 16 also has an interface to peripheral component interconnect (PCI) Express links 20a, 20b, 20c. Each PCI Express (PCIe) link 20a, 20b is connected to a respective PCIe adaptor 22a, 22b, and each PCIe adaptor 22a, 22b is connected to a respective input/output (I/O) device 24a, 24b. MC/HB 16 may additionally have an interface to an I/O bus 26 which is connected to a switch (I/O fabric) 28. Switch 28 provides a fan-out for the I/O bus to a plurality of PCI links 20d, 20e, 20f. These PCI links are connected to more PCIe adaptors 22c, 22d, 22e which in turn support more I/O devices 24c, 24d, 24e. The I/O devices may include, without limitation, a keyboard, a graphical pointing device (mouse), a microphone, a display device, speakers, a permanent storage device (hard disk drive) or an array of such storage devices, an optical disk drive, and a network card. Each PCIe adaptor provides an interface between the PCI link and the respective I/O device. MC/HB 16 provides a low latency path through which processors 12*a*, 12*b* may access PCI devices mapped anywhere within bus memory or I/O address spaces. MC/HB 16 further provides a high bandwidth path to allow the PCI devices to access memory 18. Switch 28 may provide peer-to-peer communications between different endpoints and this data traffic does not need to be forwarded to MC/HB 16 if it does not involve cache-coherent memory transfers. Switch 28 is shown as a separate logical component but it could be integrated into MC/HB 16.

In this embodiment, PCI link 20*c* connects MC/HB 16 to a service processor interface 30 to allow communications between I/O device 24*a* and a service processor 32. Service processor 32 is connected to processors 12*a*, 12*b* via a JTAG interface 34, and uses an attention line 36 which interrupts the operation of processors 12*a*, 12*b*. Service processor 32 may have its own local memory 38, and is connected to read-only memory (ROM) 40 which stores various program instructions for system startup. Service processor 32 may also have access to a hardware operator panel 42 to provide system status and diagnostic information.

In alternative embodiments computer system 10 may include modifications of these hardware components or their interconnections, or additional components, so the depicted example should not be construed as implying any architectural limitations with respect to the present invention. The invention may further be implemented in an equivalent cloud computing network.

When computer system 10 is initially powered up, service processor 32 uses JTAG interface 34 to interrogate the system (host) processors 12*a*, 12*b* and MC/HB 16. After completing the interrogation, service processor 32 acquires an inventory and topology for computer system 10. Service processor 32 then executes various tests such as built-in-self-tests (BISTs), basic assurance tests (BATs), and memory tests on the components of computer system 10. Any error information for failures detected during the testing is reported by service processor 32 to operator panel 42. If a valid configuration of system resources is still possible after taking out any components found to be faulty during the testing then computer system 10 is allowed to proceed. Executable code is loaded into memory 18 and service processor 32 releases host processors 12*a*, 12*b* for execution of the program code, e.g., an operating system (OS) which is used to launch applications and in particular the number partitioning software application of the present invention, results of which may be stored in a hard disk drive of the system (an I/O device 24). While host processors 12*a*, 12*b* are executing program code, service processor 32 may enter a mode of monitoring and reporting any operating parameters or errors, such as the cooling fan speed and operation, thermal sensors, power supply regulators, and recoverable and non-recoverable errors reported by any of processors 12*a*, 12*b*, memory 18, and MC/HB 16. Service processor 32 may take further action based on the type of errors or defined thresholds.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable media may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this invention, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, written for a variety of platforms such as an AIX environment or operating systems such as Windows 7 or Linux. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks. Such computer-readable storage media excludes transitory media such as propagating signals.

The computer program instructions may further be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Computer system 10 carries out program instructions for a number partitioning process that uses novel decomposition techniques to identify optimal solutions. Accordingly, a program embodying the invention may include conventional aspects of various partitioning tools, and these details will become apparent to those skilled in the art upon reference to this disclosure.

As noted above previous number partitioning algorithms have relied greatly on the principle of optimality, which requires that a solution be both optimal and semi-optimal, i.e., elements of any decomposition must be optimal as well. Because of this, all viable decompositions must be exhaustively considered to ensure the optimality of the composition. Furthermore, the requirement that these subproblems must be solved optimally themselves imposes a significant burden on even the most efficient implementation. The present invention relaxes this requirement and substantially reduces expectations on decomposition quality. Specifically, the present invention recognizes that a solution may be found even when the cost of a decomposed partition exceeds the optimal cost for that decomposed partition. In other words, semi-optimality is not a necessary condition for global optimality, and an optimal global solution may be composed from potentially suboptimal solutions to the subproblems of a decomposition. This approach is counter-intuitive as well as contrary to conventional solver algorithms.

Figure 2:
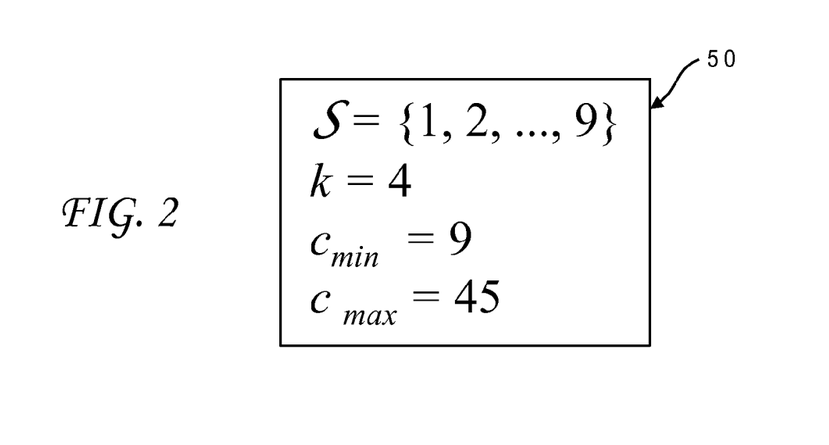
FIG. 2 is a depiction of one example for a set of numbers to be partitioned and various parameters associated with that set including initial values for upper and lower cost bounds used in a recursive call in accordance with one implementation of the present invention.

Referring now to FIG. 2, there is depicted one example of a number partitioning problem 50 which is useful in understanding the operation of the present invention. Problem 50 presents a set $S$ comprising the numbers one through nine, to be divided into four partitions (k=4) according to an objective function; in particular the objective function can be minimizing the sum of the largest partition. Computer system 10 approaches this problem using pairwise decomposition, selecting a first set for a first candidate partition of the pairwise decomposition ($P_1=\{S_1\}$), and then resolving the subproblem of the second partition ($P_2=\{S_2, S_3, \ldots, S_k\}$). Sub-solutions for $P_2$ use decompositions as well. The invention establishes lower and upper bounds $c_{min}$, $c_{max}$ for the partition costs which can be used during a recursive call invoked to resolve the subproblem. In the illustrative implementation, the bound values can be initialized based on the original number set $S$, with the lower bound assigned as the largest number in $S$, and the upper bound assigned as the sum of all numbers in $S$. Accordingly for this problem 50, $c_{min}=9$ and $c_{max}=45$. As searching proceeds recursively, $c_{min}$ is strictly nondecreasing, and $c_{max}$ is strictly nonincreasing.

In order to limit the search performed by child solvers for $P_2$ and its descendants once recursion is under way, the parameters can be passed as $<c_{min}, c_{max}>=<\max(P_1), c_{best}>$, where $\max(P_j)$ is the maximum subset sum in partition $P_j$, and $c_{best}$ is the cost of the best solution $S_{best}$ found so far. Partial assignments for the second partition are abandoned whenever any subset sum is greater than the upper cost bound ($\Sigma S_i \geq c_{max}$), or whenever the sum of the complement of a subset is greater than the upper cost bound times a multiple based on the number of assignments remaining ($\Sigma \overline{S}_i \geq *(k-i)$). More significantly, a complete solution S will be returned whenever all subset sums are less than the lower cost bound ($\rho S_i \leq c_{min}$), regardless of whether $P_2$ is an optimal decomposition. These cost bounds are distinct from any self-imposed upper and lower bounds, since they are determined by criteria computed by parent solvers. The lower cost bound criterion extends directly from the weakest-link nature of the partitioning objective function: a decomposition cannot be redeemed if its cost exceeds that of solutions encountered at higher levels, yet it receives no extra credit for obtaining sums below its neighboring partitions.

Figure 3:
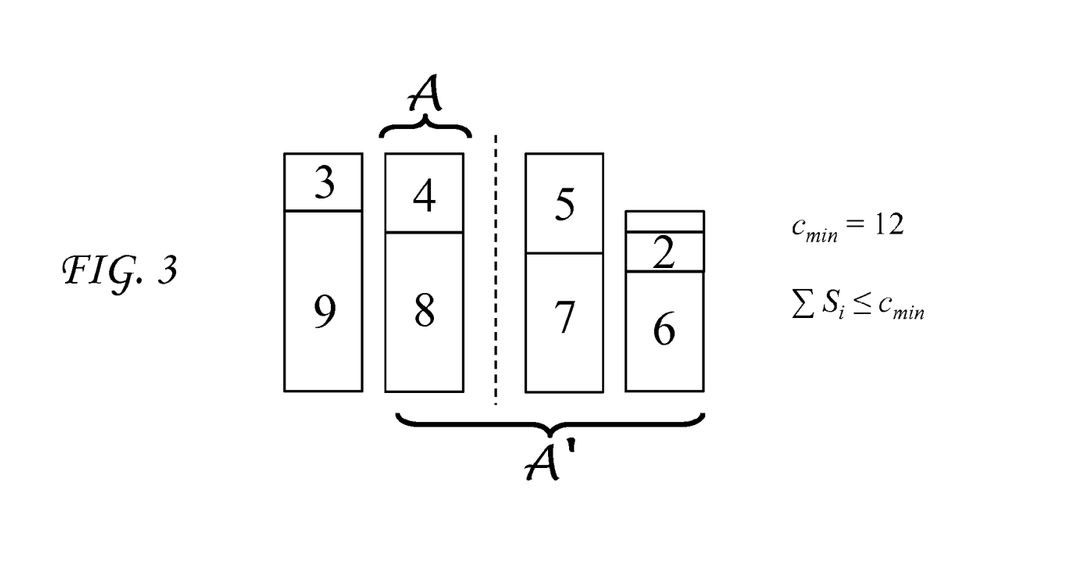
FIG. 3 is a chart illustrating a particular pairwise decomposition for the example set of FIG. 2 in accordance with one implementation of the present invention including a partial assignment for a second partition which extends to a globally optimal solution.
Figure 4:
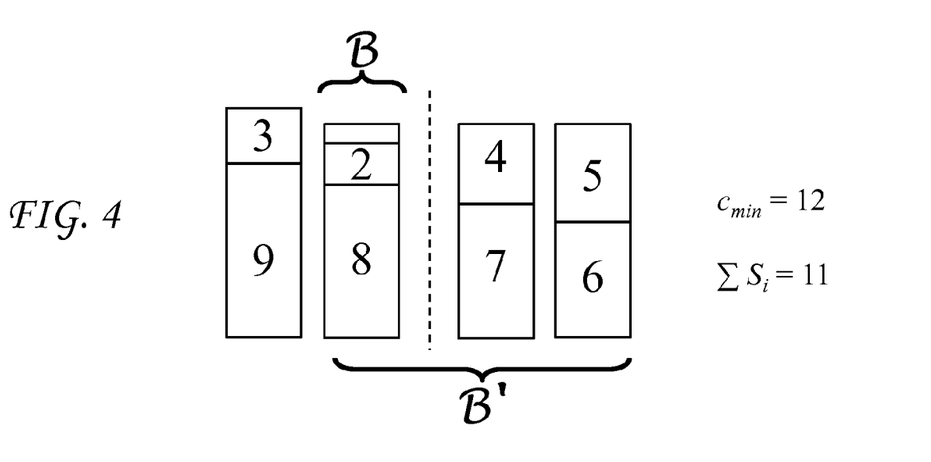
FIG. 4 is a chart illustrating another particular pairwise decomposition for the example set of FIG. 2 in accordance with one implementation of the present invention including a partial assignment for a second partition which supports a semi-optimal solution but cannot improve the global result over the solution of FIG. 3.
Figure 5:
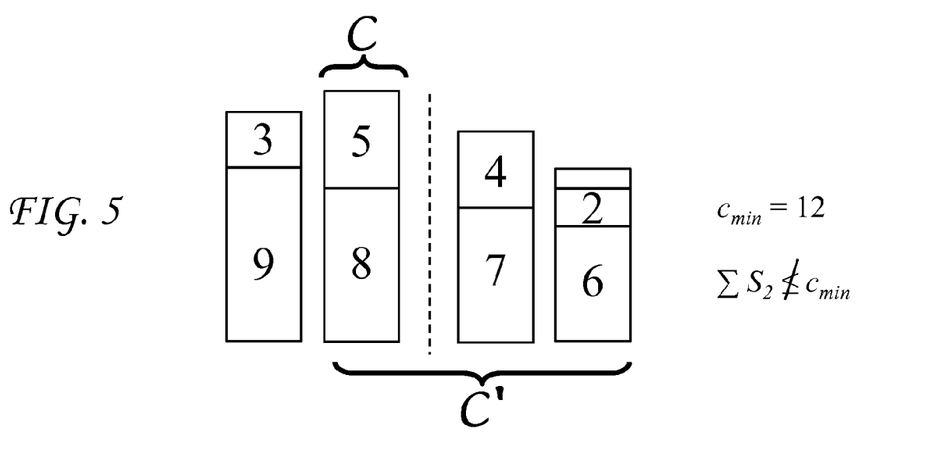
FIG. 5 is a chart illustrating yet another particular pairwise decomposition for the example set of FIG. 2 in accordance with one implementation of the present invention including a partial assignment for a second partition which is immediately pruned for having a cost greater than the cost of the first partition.

Accordingly, a global optimum solution may be found which is not semi-optimal, as seen FIG. 3. A decomposition that assigns $S_1=\{9, 3\}$ will impose the directive $c_{min}=12$ when partitioning the remaining numbers among the subsets $\{S_2, S_3, S_4\}$. For this subproblem, the partial assignment $A=<S_2>=<\{8, 4\}>$ extends to a complete assignment $A'$ which satisfies this criterion. An algorithm that requires strict semi-optimal decompositions must continue to exhaustively enumerate additional assignments, such as $B=<S_2>=<\{8, 2, 1\}>$ as seen in FIG. 4. These attempts may succeed in improving the local cost of the subproblem (e.g., assignment $B'$ achieves a locally optimal cost of 11), but they cannot improve the cost of the global solution. Hence, the present invention can prune (exclude) $B$ entirely, and return $A'$ to the topmost level as a potential optimal solution. As further seen in FIG. 5, any partial assignment, such as $C=<S_2>=<\{8, 5\}>$ which results in a sum greater than $c_{min}$ will not be returned. Graphically speaking, $c_{min}$ represents the height of the partition to the left and there must not be any partition in the decomposition that is higher.

Additionally, another form of pruning can be introduced in which dominated solutions (i.e., solutions that are cost-preserving transmutations of earlier assignments) are detected and eliminated from search. By considering a partial assignment $S=<S_1, \overline{S}_1>$ and two subsequent extensions for the next number $S_i$ to be assigned as its inclusion branch $S^+$ and its exclusion branch $S^-$, it can be shown for any complete solution $S^c$ that extends the exclusion branch it must be the case that the sum of the first subset in the complete solution is greater than the sum of the inclusion branch for that subset ($\Sigma S_1^c > \Sigma S_1^+$). In other words, surprisingly, after considering the inclusion of a number $S_i$ in a set whose sum is less than the upper bound, any subsequent extension to the set must strictly exceed that sum to obtain an improved solution. Accordingly, computer system 10 can prune leaf nodes (that is, any assignment where all numbers have been completely assigned to either $S_1$ or $\overline{S}_1$) in which there exists a number $S_i \in \overline{S}_1$ such that $(S_i + \Sigma S_1 \leq c_{min}$. Although dominance detection is sound for any variable ordering strategy, it clearly benefits from a descending sort of the numbers in $S$, since individual numbers smaller than $S_i$ will be pruned unless they are combined with others.

As a further enhancement to the present invention, symmetric solutions can also be pruned. For every solution $P=<S_1, S_2, \ldots, S_k>$, there are k! equivalent symmetric solutions that can be obtained by permuting the relative ordering of subsets. Many of these isomorphic assignments can be eliminated by artificially imposing a total ordering over subsets. Recent works have achieved such pruning by requiring subset sums to be non-decreasing. Unfortunately, such a policy defers the construction of the most influential subset (i.e., the one with maximal sum) and severely limits opportunities for pruning. Therefore the present invention instead can adopt a variation of a technique originally developed for CGA, in which a number is never assigned to more than one empty subset. This is accomplished by pruning the exclusion branch for the largest number in any subproblem solver. If the numbers are stored in decreasing order, the number $S_1$ will be forced into subset $S_1$, number $S_2$ will be assigned to subset $S_2$ (assuming it is excluded from $S_1$), and so on.

Figure 6:
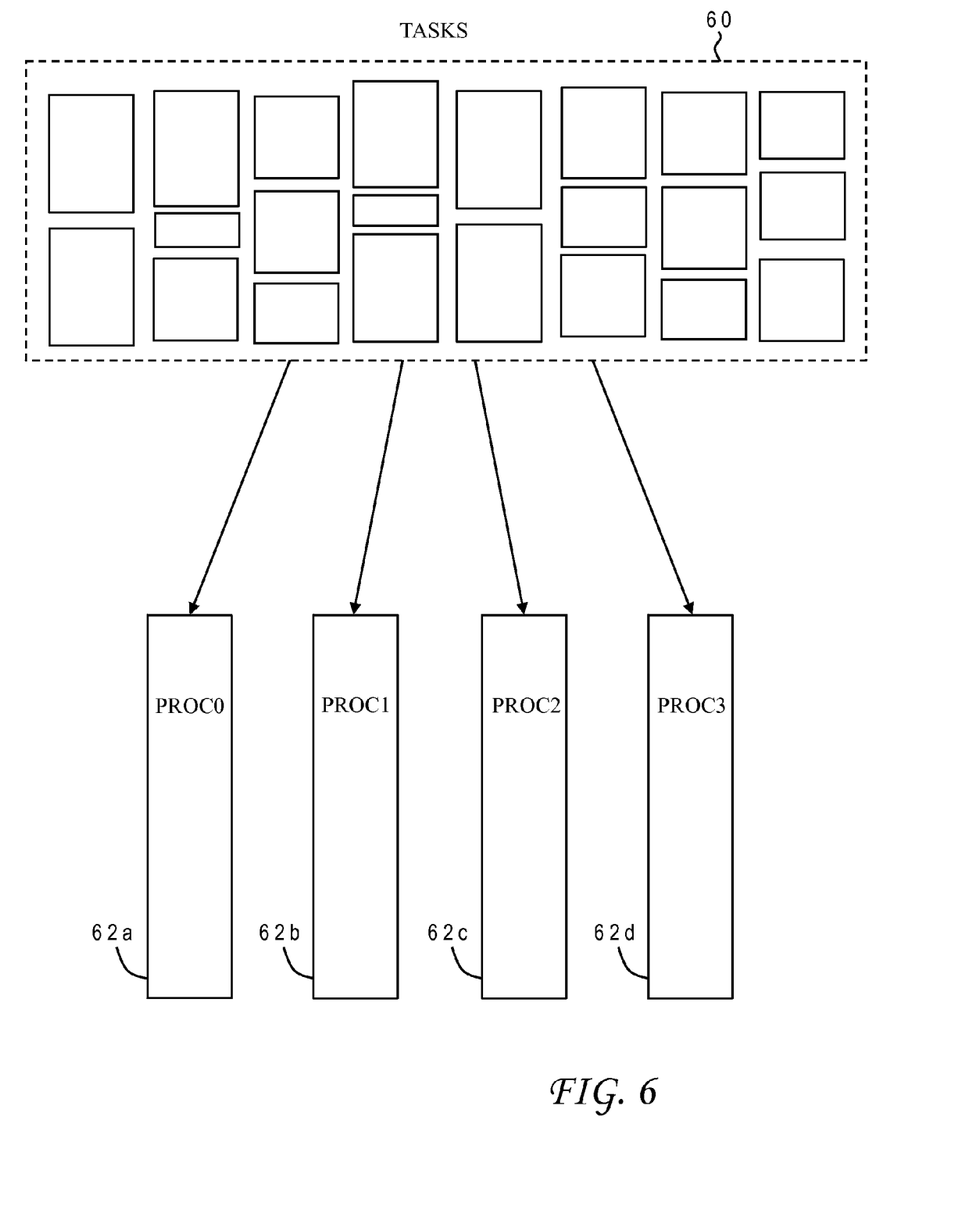
FIG. 6 is a block diagram depicting assignment of a plurality of tasks having different time costs to a set of processors in a multi-processor computer system in accordance with one application of the present invention.

The foregoing techniques have applicability to a wide range of real-life number partitioning problems. One example of a particularly useful application is multiprocessor scheduling as illustrated in FIG. 6, but this example should not be construed in a limiting sense as it is only one of many possible applications. In the multiprocessor scheduling problem, a plurality of programming tasks 60 must be assigned to multiple processors 62a, 62b, 62c, 62d. The processors may be components of a computer system such as computer system 10. Each task has a certain execution time associated with it, as depicted by the different heights of the rectangles representing each task. These time amounts correspond to the set of numbers $S$ to be partitioned, in this case, in a 4-way partition. Use of the number partitioning methodology of the present invention results in the most efficient allocation of the tasks to the processors, so that the maximum time spent by any given processor is minimized.

Figure 7:
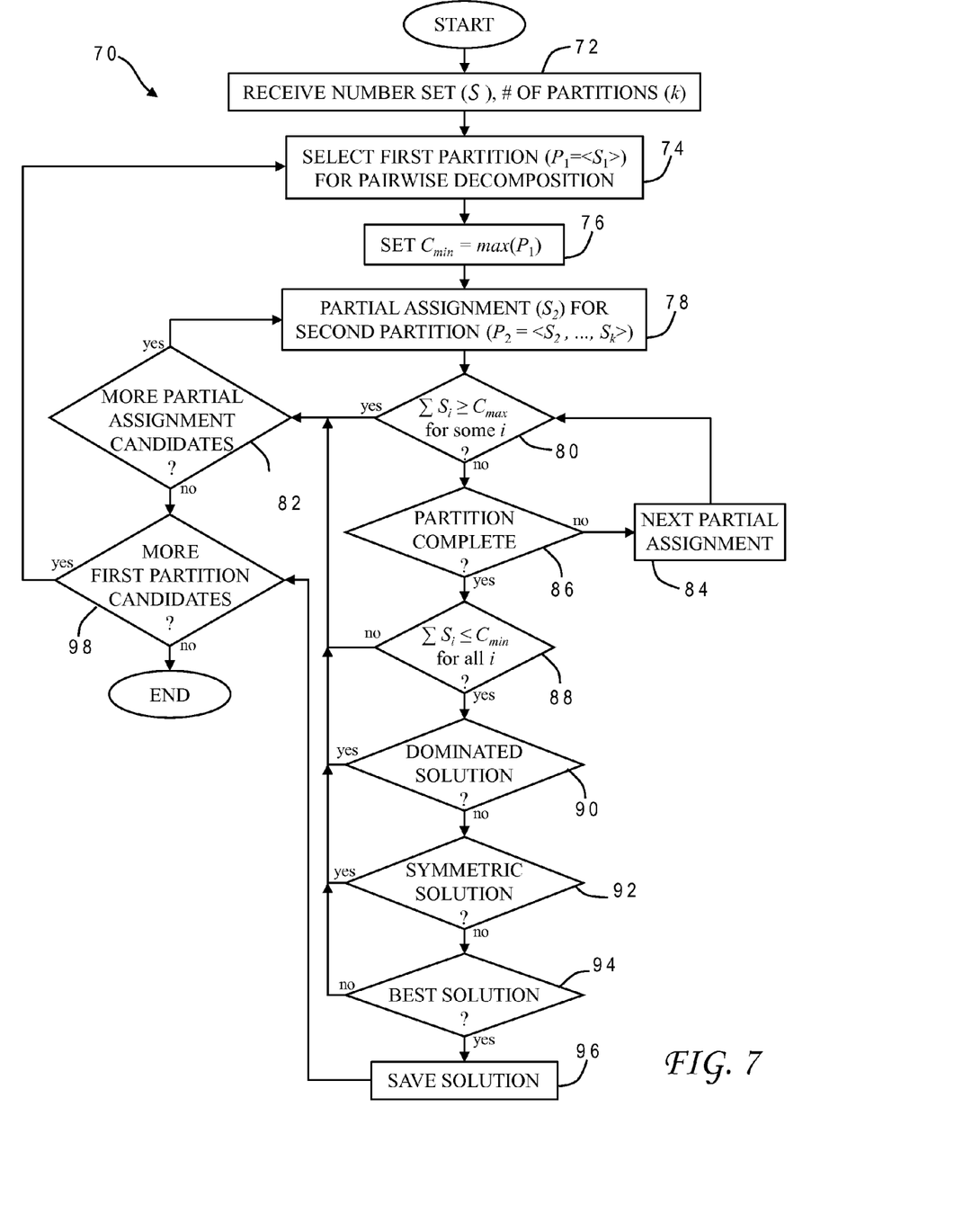
FIG. 7 is a chart showing the logical flow for a number partitioning process in accordance with one implementation of the present invention.

The present invention may be further understood with reference to the chart of FIG. 7 which illustrates the logical flow for a number portioning process 70 in accordance with one implementation of the present invention. Process 70 begins when the system (e.g., computer system 10) receives the number set and the number of partitions desired (72). A subset is then selected for the first partition of the pairwise decomposition (74). Any conventional approach may be used to establish the first partition. In the exemplary implementation, computer system 10 constructs potential subsets by exploring an inclusion-exclusion binary tree. However, balanced ([k/2, k/2] decompositions need not be considered in the case of even values for k; this affords additional pruning capabilities, and also ensures consistent performance regardless of the parity of k. Each leaf within this tree corresponds to a complete assignment to a single partition subset $P_1=<S_1>$, with all remaining numbers assigned to subsequent subsets $P_2=<S_2, S_3, \ldots, S_k>$ through induction. Inclusion branches are given precedence.

The maximum subset sum of the first partition $P_1$ so established is used to set the lower cost bound $c_{min}$ (80). Partial assignments then begin for the subsets forming the second partition $P_2$ (82). If any subset sum exceeds the cost of the best solution so far found, that partial assignment is pruned and the process looks for more partial assignment candidates (84), returning iteratively to box 78. Partial assignments continue (84) until the second partition is complete (86). If a completed solution keeps each subset sum below or at the lower cost bound, that solution is potentially an optimal solution (88). Solutions are screened for dominance (90) and symmetry (92). If an optimal solution is not dominated, not symmetric, and is better than any solution so far found (94), it is saved as the best solution (96). In this case the system does not need to examine other decompositions having the current first partition $P_1$, so it proceeds to consider other candidate subsets for the first partition (98), returning iteratively to box 74 until all viable first partitions have been explored. Not only will the final solution be the global optimal solution, but further the process exhibits anytime behavior, meaning that the algorithm can be terminated at any time and can provided the best solution seen so far.

As one measure of the efficacy of this novel approach, a comparison was performed of the weakest-link optimization versus the improved recursive number partitioning (IRNP) algorithm. A solver according to the present invention was implemented in less than one hundred lines of C++ code and executed on a 3.47 GHz Intel Xeon Processor. The largest suite of benchmarks in the literature were considered, where k ranges from 7 to 10, and n is varied between 20 and 40. In each benchmark, n random numbers were generated uniformly in the range $[0, 2^{31}-1]$. For every setting of k and n, runtimes were averaged over a set of one hundred instances. In this comparison, the solver of the present invention dramatically outperformed IRNP on all test case. Furthermore, the runtime gap between the two algorithms consistently widened with increased values of k. At the highest setting of k=10, the weakest-link optimality approach demonstrates an improvement of up to three or even four orders of magnitude. For the largest set of problems solved by both algorithms, IRNP required nearly two hours on average, whereas the runtime of the inventive solver remained well under one second.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. For example, while the invention has been described in the context of a pairwise decomposition, those skilled in the art will appreciate that any higher-order decomposition can effectively be reduced to a sequence of nested binary decompositions. It is therefore contemplated that such modifications can be made without departing from the spirit or scope of the present invention as defined in the appended claims.

What is claimed is:

1. A method of optimally assigning a plurality of programming tasks to a plurality of processors using multi-way partitioning of a set of positive numbers representing processing costs for the plurality of programming tasks comprising:
   establishing a first partition for a pairwise decomposition of the set wherein the first partition has a first candidate subset of the numbers, by executing first instructions in a computer system;
   setting a lower cost bound equal to a maximum cost of the first candidate subset according to an objective function, by executing second instructions in the computer system;

recursively generating second partitions for the pairwise decomposition wherein each second partition has a plurality of second candidate subsets of the numbers, by executing third instructions in the computer system;

determining that each second candidate subset in a selected one of the second partitions has a cost according to the objective function which is less than or equal to the lower cost bound, by executing fourth instructions in the computer system;

responsive to said determining, returning the first partition with the selected second partition as an optimal solution regardless of whether the selected second partition is an optimal decomposition, by executing fifth instructions in the computer system; and assigning the plurality of programming tasks to the plurality of processors according to the optimal solution, by executing sixth instructions in the computer system.

2. The method of claim 1 wherein said generating excludes any second candidate subset having a cost according to the objective function which is greater than or equal to a pre-established best cost.

3. The method of claim 1 wherein the objective function is minimizing a sum of a largest partition of the set of numbers.

4. The method of claim 1 wherein said generating excludes any partition which extends to a solution that is dominated by an earlier generated partition by determining that a particular number in the set is an element of a complement subset of the first partition and that the particular number added to a sum of the first candidate subset is less than or equal to the lower cost bound.

5. The method of claim 1 wherein said generating excludes any partition which extends to a solution that is symmetric with an earlier generated partition by identifying an exclusion branch for a largest number in any second candidate subset.

6. The method of claim 1 further comprising:
iteratively repeating said establishing, said setting, said generating, said determining and said returning for different pairwise decompositions of the set using different first candidate subsets to return multiple optimal solutions; and saving one of the multiple optimal solutions having a lowest cost according to the objective function as a best solution.

* * * * *